US006945379B2

(12) United States Patent
Hauer et al.

(10) Patent No.: US 6,945,379 B2
(45) Date of Patent: Sep. 20, 2005

(54) CHAIN SEGMENT FOR PERSONNEL CONVEYOR

(75) Inventors: Uwe Hauer, Nienburg (DE); Andreas Stuffel, Porta Westfalica (DE); Joerg Ostermeier, Bueckeburg (DE); Dietmar Thaler, Seggebruch (DE); Andreas Vogt, Woelpinghausen (DE)

(73) Assignee: Otis Elevator Company, Farmington, CT (US)

( * ) Notice: Subject to any disclaimer, the term of this patent is extended or adjusted under 35 U.S.C. 154(b) by 92 days.

(21) Appl. No.: 10/432,522

(22) PCT Filed: Nov. 15, 2001

(86) PCT No.: PCT/US01/45087

§ 371 (c)(1),
(2), (4) Date: May 23, 2003

(87) PCT Pub. No.: WO02/44069

PCT Pub. Date: Jun. 6, 2002

(65) Prior Publication Data

US 2004/0045790 A1 Mar. 11, 2004

Related U.S. Application Data

(63) Continuation-in-part of application No. 09/724,090, filed on Nov. 28, 2000, now Pat. No. 6,450,316.

(30) Foreign Application Priority Data

Feb. 8, 2001 (DE) ........................................ 101 05 685

(51) Int. Cl.[7] ........................ B65G 15/00; B65G 17/00; B66B 23/12; B66B 21/00; B66B 23/00

(52) U.S. Cl. ........................ 198/326; 198/321; 198/333

(58) Field of Search ................................ 198/321, 326, 198/329, 333

(56) References Cited

U.S. PATENT DOCUMENTS 4,064,986 A * 12/1977 Bertovich ................... 198/326
4,569,433 A * 2/1986 Ishida et al. ................ 198/333
5,033,606 A * 7/1991 Matoba et al. .............. 198/328
5,381,881 A * 1/1995 Meyer et al. ............... 198/333

FOREIGN PATENT DOCUMENTS

DE 2346266 A 3/1975
GB 354169 A 7/1931

* cited by examiner

*Primary Examiner*—Gene O. Crawford

(57) ABSTRACT

Personnel conveyor (2) featuring endless personnel conveyor belt (6) formed of numerous step elements (4), in which step elements (4) are attached to conveyor chains (8) along both of their sides that are driven around a first and a second reversal element, and in which conveyor chains (8) are constructed of a multitude of chain links (10) that are connected to each other at pivots (12), and where the segmentation ratio of conveyor chain (8) to personnel conveyor belt (6) is 1:1, characterized in that two chain links (10), which are equally positioned in relation to a step element (4), are connected to each other by means of a through-going connecting axle (32) attached to chain links (16) between each two pivoting points of chain links (10).

11 Claims, 4 Drawing Sheets

Figure 3B:
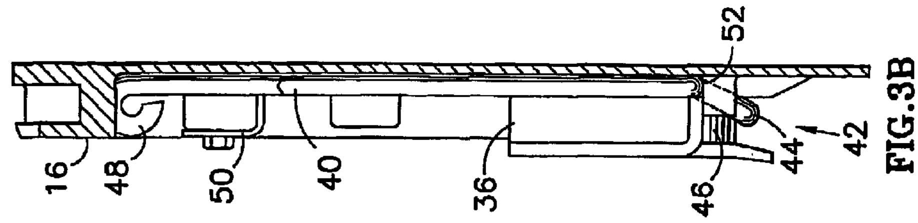

FIG.1
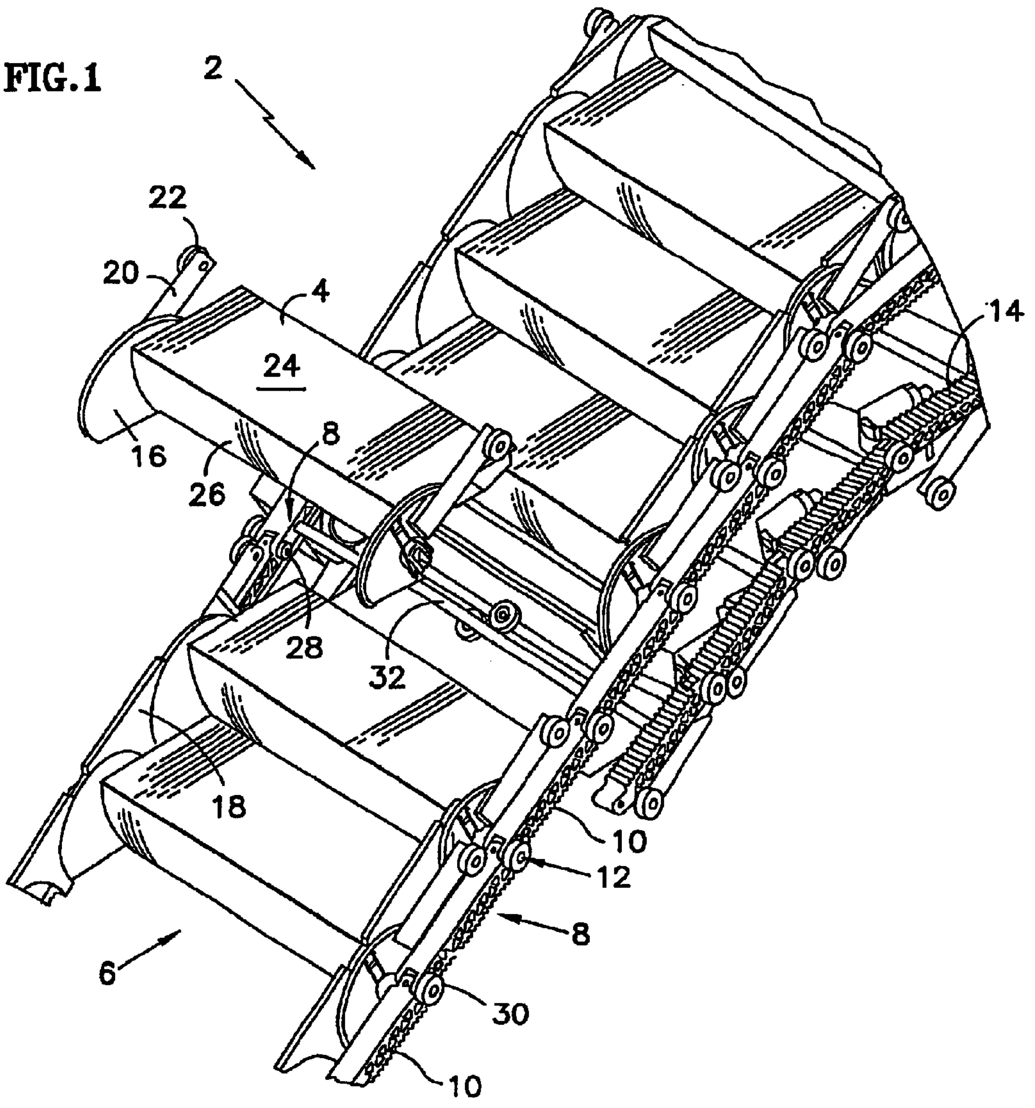
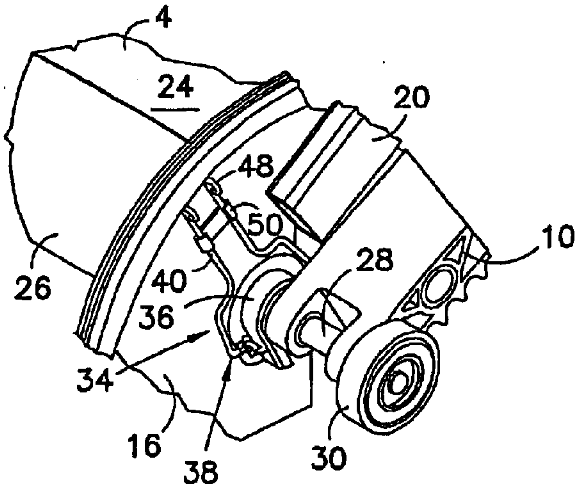
FIG.2

FIG.6
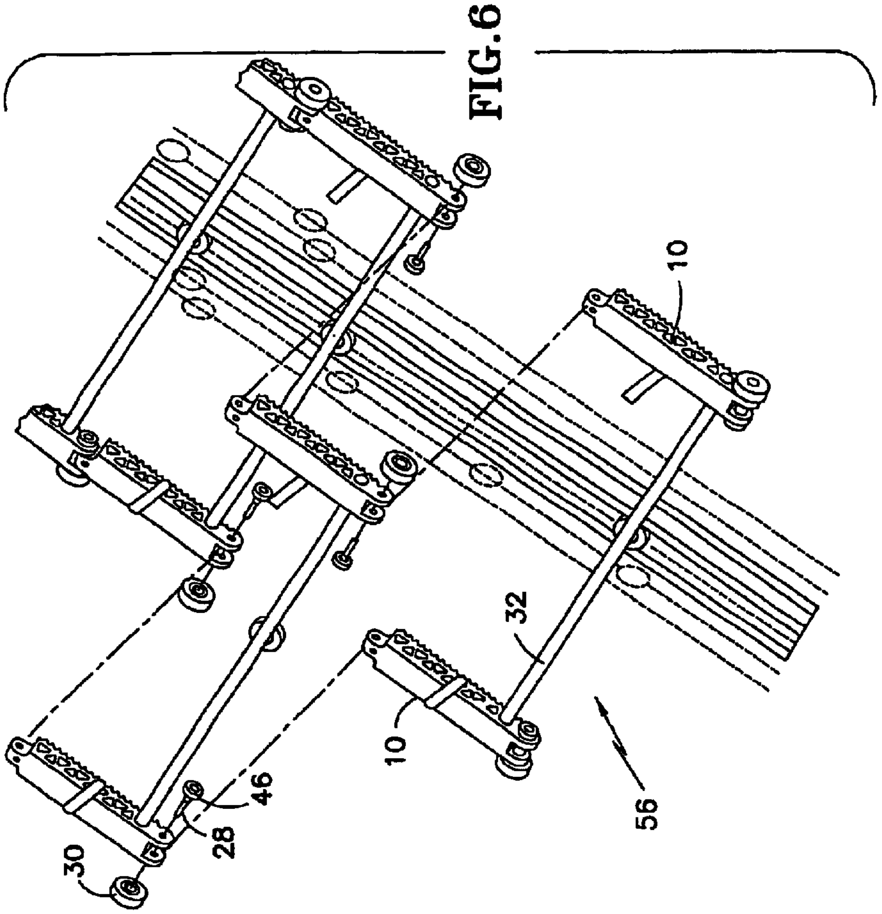
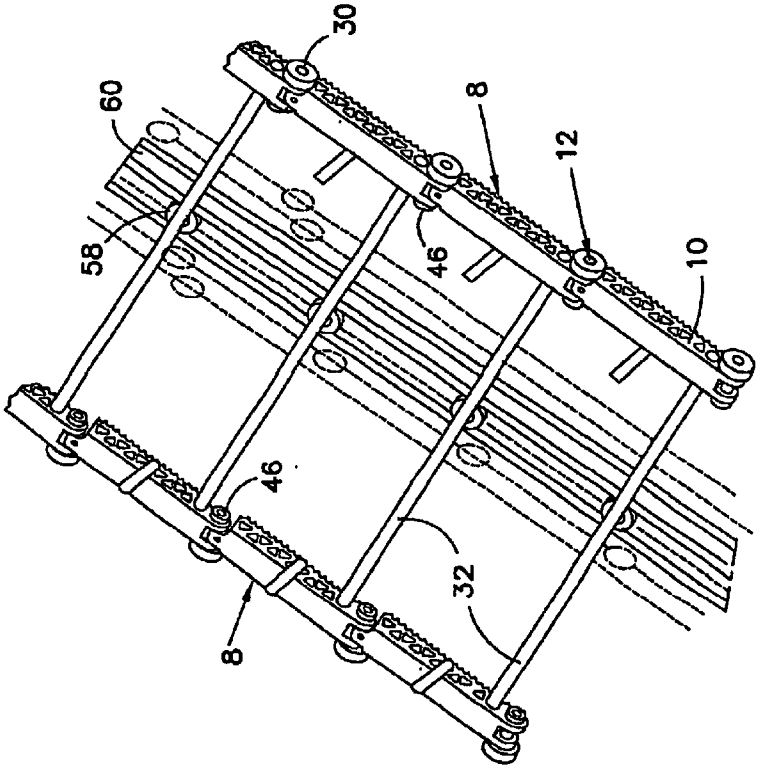
FIG.5

CHAIN SEGMENT FOR PERSONNEL CONVEYOR

This application is a 371 of PCT/US01/45087 filed Nov. 15, 2001 which is a continuation-in-part of application Ser. No. 09/724,090 filed Nov. 28, 2000 now U.S. Pat. No. 6,450,316.

The invention concerns a personnel conveyor, featuring an endless personnel conveyor belt consisting of numerous step elements connected to each other, where the step elements are attached along their sides to conveyor chains which are driven around a first and a second reversal element by a drive, where the conveyor chains are constructed of a multitude of chain links which are connected to each other at pivots, and where the segmentation ratio of conveyor chain to personnel conveyor belt is 1:1—that is, one step element is attached to each chain link of a conveyor chain.

Escalators and moving sidewalks are typical examples of these types of personnel conveyors. Typically an escalator features a multitude of movable step elements connected to each other, called "steps," which are driven around upper and lower reversal wheels by a drive motor. These interconnected steps are called a personnel conveyor belt or a step band. Similarly, moving sidewalks can feature numerous palet bodies connected to each other, which are also driven around two reversal chain wheels. With moving sidewalks, the personnel conveyor belt is typically called a pallet belt.

A drive motor which drives the reversal chain wheels at one end of the personnel conveyor typically drives such personnel conveyors, typically the upper reversal chain wheels with respect to moving sidewalks. However, alternative drive concepts are also known where linear drives that work upon the conveyor chain, for example, provide the drive of the personnel conveyor. One possibility for such a linear drive uses a special conveyor chain, the chain links of which feature drive teeth, and a linear drive that is provisioned with a revolving drive belt that is also toothed, which works together with the teeth of the drive chain. Other types of drives are also known, inductive types for example, where the drive chain itself forms the movable part of a linear motor. A general advantage of linear drives lies in that instead of a large drive motor in the area of the entrance or exit, a multitude of smaller drive motors can be provisioned, distributed over the entire conveyor path, which makes an overall more compact design of the personnel conveyor possible. A further advantage is evident in that, with a linear motor, uniform drive performance can be achieved independently from the length of the chain links and the size of the drive chain wheel.

In such cases where the drive function of the personnel conveyor does not result through a reversal chain wheel, a reversal panel or an essentially semicircular guide track can also be provisioned, which attaches to the guide tracks of the conveyor chain rollers, and in which the conveyor chain rollers circulate from the outside area to the reversal area of the personnel conveyor. The term reversal encompasses all possible constructions, for example, a reversal chain wheel, reversal guide track, or reversal panel.

Servicing of personnel conveyors in general, but particularly servicing of personnel conveyors with linear drives that are distributed over the entire conveyor path regularly encounters the problem that one or more step elements in some place on the conveyor path must be removed from the personnel conveyor belt. Since personnel conveyors are generally constructed so that the removal of step elements in the area of the reversal can occur relatively easily (in the narrow reversal radius, the step elements are swung so far against one another that a sufficiently broad gap forms between two step elements for a service person to reach through and dismount a step element from the chain), the conventional procedure in this case is the following: the personnel conveyor is positioned so that the step element to be removed is in the reversal area. This procedure alone is complicated enough, but with linear-driven personnel conveyors, a problem arises occasionally, because of defective linear drives, that makes operating the personnel conveyor impossible or makes its operation possible only if one accepts the infliction of additional damage to the apparatus.

Another problem arises after the step elements have been dismounted, when it becomes necessary to open the conveyor chain at some position in the conveyor area to exchange parts of the conveyor chain or to move larger assembly parts from the interior of the personnel conveyor to the outside, for example. Basically, one can imagine the design of a conveyor chain in a ladder-shape, where the side elements of the ladder are formed by the conveyor chains running parallel to each other. Extending traverse to the conveyor chains are connecting axles that connect one chain link of one conveyor chain to a respective chain link in the other conveyor chain, and also serve to attach the step elements. Typically, the connection axes are provisioned at pivots through which individual chain links are connected to each other. In the area of the chain links or on a part of the axis that is set to the outside of the chain links, chain rollers that run in a guide track are provisioned that essentially carry the weight of the chain, the step element, and the passengers. This construction is, however, problematic in a 1:1 segmentation ratio, as far as dismounting them at a desired position on the conveyor path is concerned, since the through-going axles are attached to the side chain rollers in the guide tracks. If a 1:2 or a 1:3 . . . segmentation ratio is used, however, the problem does not occur because the conveyor chain can be opened at a pivot that does not have a through-going step axle for attaching a step element provisioned on it.

U.S. Pat. No. 4,232,783, which shows the characteristics of the generic part of claim 1, solves this problem in that some of the connecting axles, as well as the chain links themselves, are provisioned so that they can be separated. The result is that a relatively large number of different individual parts are necessary for the conveyor chain and the connecting axles, which results in higher production and service costs. All connections that can be loosened also have a certain play and are prone to a certain wear, which shortens their life expectancies.

Escalators are also known that utilize standard chains for the purpose of cost reduction. Because of these available chains, a 1:x segmentation ratio is unavoidable—that is, only every $x^{th}$ chain link has a step attached to it. A connecting axis is provisioned for attaching a step that is, for example, welded to one of the chain links between two pivots. Such an attachment of the step element outside of the pivots of the chain is associated with considerable disadvantages, in particular in the upper and lower transition areas, so that a person skilled in the art has had no reason to apply this solution, which is fraught with disadvantages, for normal chains in a personnel conveyor with a 1:1 segmentation ratio.

Thus it is the task of the invention at hand to provide a personnel conveyor with a pair of conveyor chains designed in such a way that single chain segments in any position in the conveyor area can be disassembled in a simple manner and without complex disassembly work.

According to the invention, this task is accomplished in that two chain elements with the same position with respect to a step element are connected to each other by a throughgoing connecting axle that is fastened between the two pivots on each chain link.

This solution has the advantage that the connecting axles extending traverse to the conveyor chains are provisioned to be independent of the pivots and chain rollers. The chain links can be connected to each other at the pivots between two chain links by means of relatively short connecting bolts, to the outer sides of which (that is, to the sides facing away from the step elements) the chain rollers are attached. It is also possible to attach the chain rollers between inner and outer chain links, as quasi-components of the conveyor chain. In order to remove a conveyor chain segment of this type, which consists of both chain links and the connecting axles, it suffices to pull the connecting bolt that connects two interconnected chain segments out to the inside, whereby the chain roller is, for example, pushed off to the outside. As soon as numerous connecting bolts of a conveyor chain segment are removed, the entire segment can be taken out of the system without the guide rail of the chain rollers hindering its removal.

The connecting axis can, for example, be fastened to both of the chain links through welding, soldering, or gluing. It is also possible to provision a screw connection between connecting axles and chain segments so that, if it is necessary, a conveyor chain segment can also be disassembled.

Preferably, a guide roller is attached to the connecting axle between the chain links, the rotating axis of which is provisioned essentially at a right angle to the plane between the two chain segments, and further, it is preferable to provision a guide track on the personnel conveyor of the type that works together with the guide roller to guide the conveyor chains and the personnel conveyor belt along the sides. It must be pointed out that this type of personnel conveyor, guided from the sides, is in itself considered to be inventive, and in particular without, or with only a part of, the characteristics of claim 1. Guides along the sides of the personnel conveyor belt became an increasing problem with increased traffic in lubrication-free systems. Originally, the guide tracks of the chain rollers were provisioned with flanges on the sides, so that the chain rollers had simultaneously taken over the guiding function on the sides. With lubricated chain systems, enough lubricant was present that the differing relative speeds of the side surfaces of the chain rollers and of the flanges of the guide tracks practically played no role. With lubrication-free chain systems, this area is essentially more problematic, and after a relatively short amount of time, distinct wear of the chain rollers occurs in conjunction with a substantial noise increase. Traverse guide rollers were already suggested as a solution to this problem, the rotating axis of which runs at a right angle to the plane between the two conveyor chains. Typically, these were provisioned on the chain links. In particular, because of the very limited space conditions in the area of the chain links, the solution remains unsatisfactory. In particular, the rigid connection of the two chain links, through the firmly connected connecting axle, makes it possible to bring about this traverse guide element by means of guide rollers which are provisioned on the connecting axle itself.

Preferably, the guide rail has an essentially U-shaped cross-sectional profile, and the guide roller is preferably provisioned between the two shanks of the U, where the distance between the two shanks of the U is somewhat larger than the diameter of the guide roller.

Alternatively, the guide rail has an essentially T-shaped cross-sectional profile, and two guide rollers are preferably provisioned on one connecting axle and work together with the bridge of the T-shaped guide rail.

Preferably, two chain links are connected to each other at a pivot with a bolt, where at least part of the bolt is configured so that a step element can be attached. In this arrangement it is preferable that the attachment of the step element to the conveyor chain be accomplished by means of a mounting device on the sides of the step element. The mounting device can be configured in the form of a quick fastener, locked by a retaining spring, for example, so that particularly simple and fast dismounting of a step element can occur, even directly at the desired position on the conveyor path.

The combination of chain links and connecting axles is preferably configured so that it can be dismantled. This makes it possible to exchange worn parts if necessary. It has the further advantage that single parts are more easily transportable.

A step element is preferably attached to every pivot in the conveyor chain. This means that the segmentation of the guide chain is such that one chain link is provisioned per step element on the conveyor chain. Such a configuration is particularly presentable if the personnel conveyor is driven by a linear drive. With conventional drives by means of drive chain wheels, other segmentation ratios are conventionally necessary, for example, three chain links per step element, to ensure fairly smooth and regular drive performance of the personnel conveyor.

The invention further concerns a conveyor chain segment for the conveyor chain pair of a personnel conveyor according to the invention, where a conveyor chain features a multitude of chain links that are connected to each other at pivots, where one chain link of one conveyor chain and one chain link of the other conveyor chain are connected to each other by means of a connecting axle that is fastened between the two pivots on each chain link.

Figure 3A:
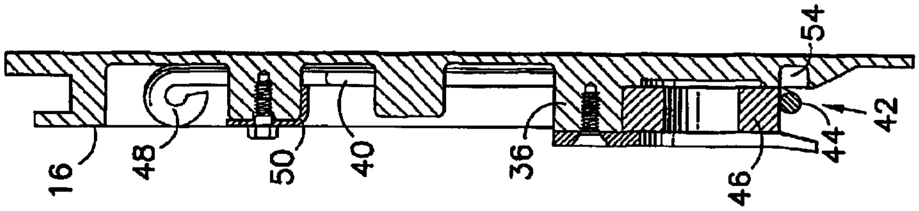
Figure 3:
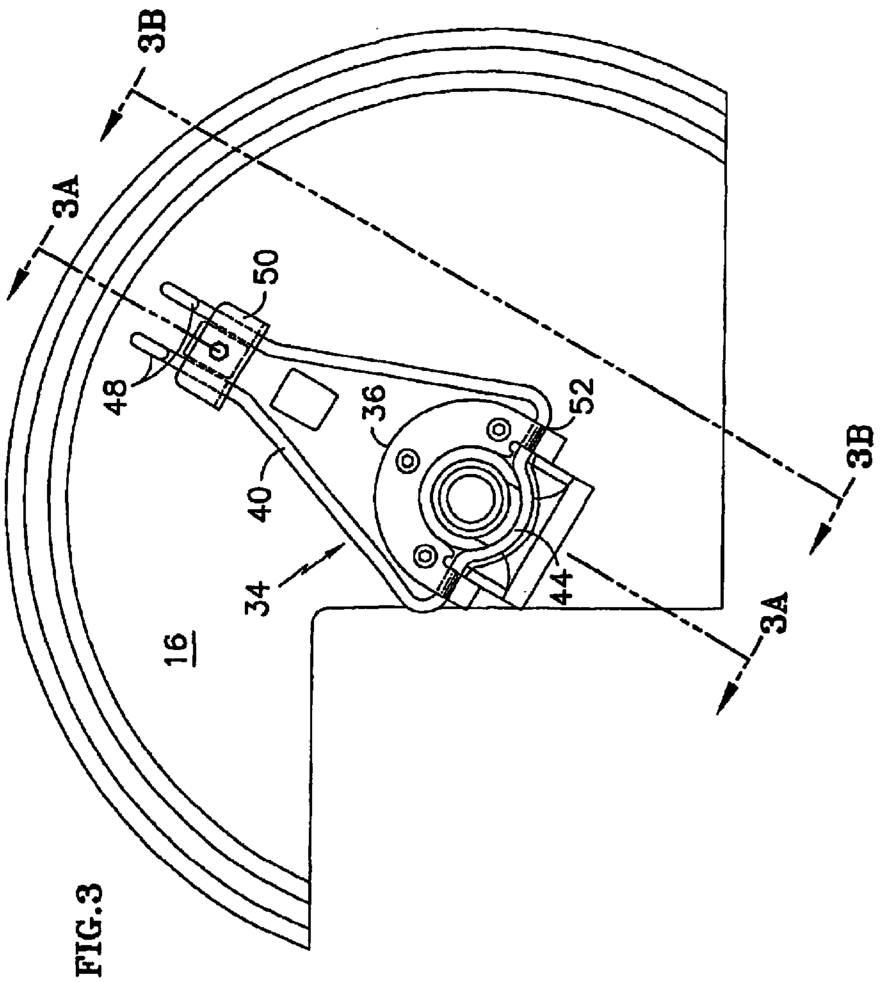
Figures 4, 4A, 4B:
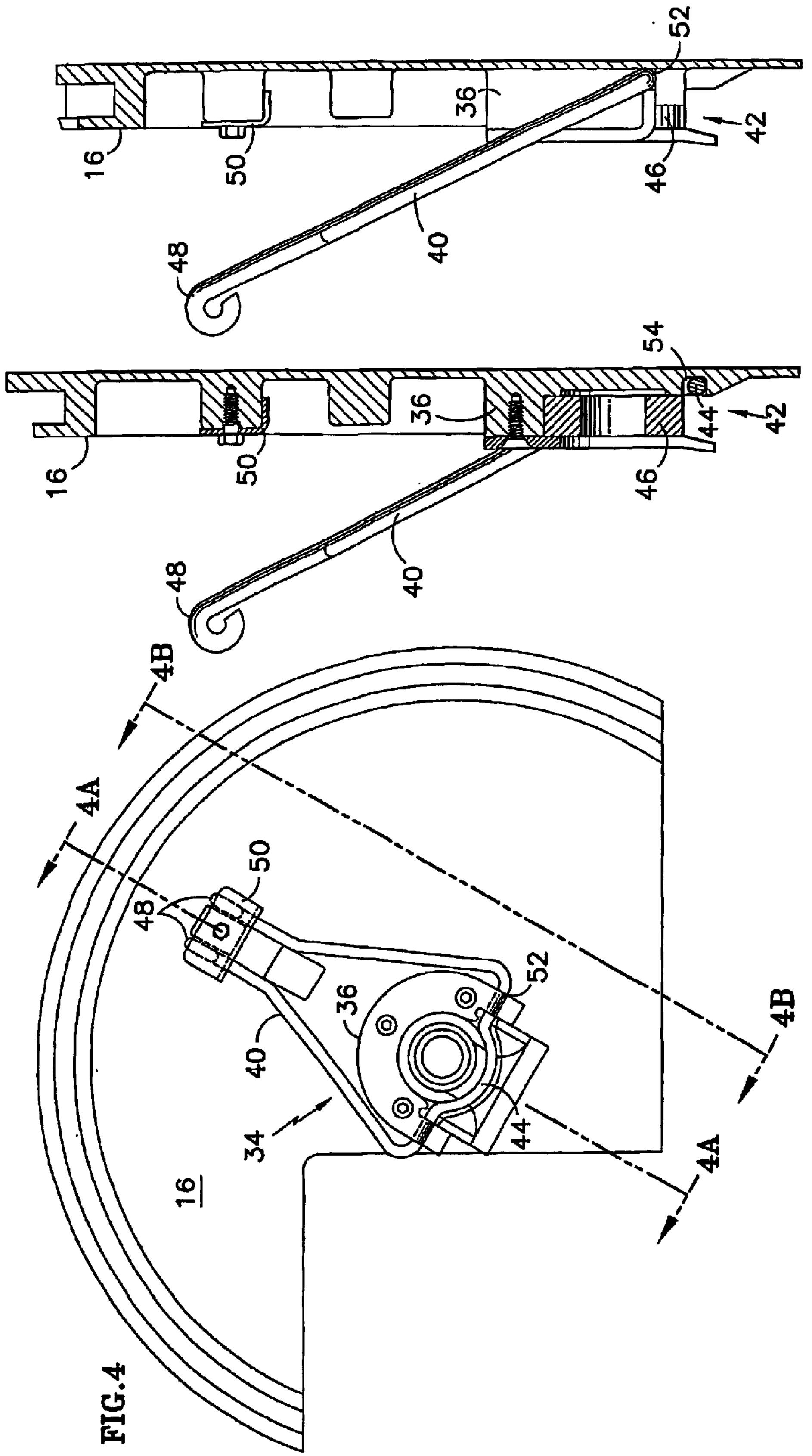

The invention and one embodiment of the invention are more closely described in the following by means of a graphically represented embodiment. The figures show:

FIG. 1 part of a personnel conveyor according to the invention;

FIG. 2 an enlarged perspective view of a lateral mounting device of a personnel conveyor according to the invention, FIG. 3 a side view of a lateral mounting device with a retaining spring in its closed state;

FIG. 3A a cross-sectional view along line A—A according to FIG. 3;

FIG. 3B a cross-sectional view along line B—B according to FIG. 3;

FIG. 4 a side view of a lateral mounting device with a retaining spring in its open state;

FIG. 4A a cross-sectional view along line A—A according to FIG. 4;

FIG. 4B a cross-sectional view along line B—B according to FIG. 4,

FIG. 5 a partial view of the step chain configuration of a personnel conveyor according to the invention;

FIG. 6 an exploded view of a step chain design according to FIG. 5

In FIG. 1, personnel conveyor 2 can be seen featuring personnel conveyor belt 6 that is formed by numerous step elements 4 connected to each other. Step elements 4 are connected along their sides to conveyor chain 8, which is formed by a multitude of chain links 10. Chain links 10 are connected to each other at pivots 12. Personnel conveyor 2 is driven by a linear drive (not shown) that is configured as the type that has an endlessly circling toothed drive belt. The teeth of the toothed drive belt engage teeth 14 of chain links 10.

One of step elements 4 is removed from personnel conveyor belt 6. One can see that flange elements 16 are provisioned at the sides of step element 4 that move together with step element 4. Flange elements 16 are fastened rigidly to the step element, and another type of flange element 18 is provisioned between every two flange elements 16. A cover (not shown) attaches to flange elements 16, 18 of step elements 4, extending up to the balustrade.

While conveyor chains 8 circulate step elements 4, step rollers 22, attached to arms 20, serve to regulate the position of the step surface or step 24 of step element 4. Step roller 22 is guided by a guiding track (not shown). The guiding track follows a preset curved course for step wheel 22, so that all step elements 4 are necessarily secured in position.

Personnel conveyor 2, as pictured, is an escalator. With regard to escalators, personnel conveyor belt 6 is called a step belt, and step elements 4 are called step bodies. Step body 4 features, as already mentioned, step surface 24 that is also called a step, and step front 26 that is also called a riser.

Individual chain links 10 of conveyor chain 8 are connected at pivots 12 by means of short pintles 28. Chain wheels 30 are attached in a movable fashion on the outside of pintles 28.

Chain links 10 of left and right step chains 8, provisioned in the same position with regard to step element 4, are firmly connected to each other by means of connecting axle 32. One can see that connecting axle 32 does not extend outside chain links 10. In the enlarged partial representation on FIG. 2, one can more clearly see lateral mounting device 34, by means of which step element 4 is attached to conveyor chain 8. In particular, one can see pocket-like receiving element 36 in which a stubby extension of engagement bolt 28 is retained. Retaining spring 40 forms locking device 38, by means of which the free end of engagement bolt 28 is retained.

FIGS. 3, 3A, 3B show lateral mounting device 34 with locked spring 40. In view 3A, in particular, one can see pocket-like receiving element 36, which is open toward the bottom. In the pictured embodiment, receiving element 36 is fastened to flange element 16. However, it can just as well be fastened to step element 4 itself. In the area of bottom opening 42 of receiving element 36, one can see insertion slants, which facilitate the insertion of the engagement elements into receiving device 36. One can further see lower end 44 of retaining spring 40, which closes bottom opening 42. In the view of FIG. 3A, one can further see rotating bearing 46 that fits into the outer ring in receiving device 36. Lower end 44 of retaining spring 40 presses the outer ring of bearing 46, which is also called a step bearing, into the receptacle of receiving device 36. Upper free ends 48 of retaining spring 40 are secured behind mounting nose 50. In particular, in FIG. 2, one can see that a service person can relatively easily grasp both free ends 48 of the spring and move these out of mounting noses 50 by compressing each spring. In FIG. 3, one can see how lower end 44 of the retaining spring encloses the outer ring of step bearing 46. One can further see that spring 40 itself is pivotably attached on receiving element 36 at position 52.

FIG. 4 shows how retaining spring 40 is swiveled away from step element 4 around swivel bearing 52. One can see, in particular, in FIG. 4A that recess 54 is provisioned in receiving device 36 into which lower end 44 of retaining spring 40 is lowered by pivoting retaining spring 40. Thus bottom opening 42 is free, so that the step bearing can be taken out of receiving element 36 and so that step element 4 can be removed from conveyor chain 8 in its entirety.

A comparison of FIGS. 2 and 3, 4, respectively, shows that retaining spring 44 can be configured differently. One special advantage of retaining spring 40 also lies in that it is relatively simple to reliably ascertain whether or not retaining spring 40 is fulfilling its task. Generally, one can assume that retaining spring 40 is fulfilling its task if its two free ends 48 are secured behind mounting noses 50. If they are not, the spring tension impels free end(s) 48 of retaining spring 40 to swing in an outward direction. By means of a simple visual, mechanical, or electronic safeguarding device, the position of free ends 48 of retaining spring 40 can be checked. Such a sensor can be connected to the controls of the personnel conveyor and can be provisioned such that it checks every free end 48 of retaining spring 40, on one side of step element belt 6, once with every cycle of step element belt 6.

The engagement element, which works together with receiving element 36, does not absolutely have to be positioned at pivot 12 between two chain links 10. It is quite possible to position a through-going axle of the conventional type at pivot 12 and to provision engagement elements of the lateral mounting device on chain link 10 in the area between two pivots 12 of chain link 10. The engagement element does not necessarily have to have the form of a bolt. It can also have the form of an engagement nose that engages with receiving element 36. It is also possible to provision receiving element 36 on chain link 10 and to provision the engagement element on step element 4. Instead of retaining spring 40, a different locking device 38 can also be provisioned. It is possible, for example, to provision a screw connection, a quick fastener, or another suitable connection. The particular advantage of the embodiment described here lies in that, after the cover in the area of the balustrade has been removed, individual step elements 4 can be removed from conveyor belt 6 without problems and without the aid of tools. An additional advantage is to be seen in that there are no loose parts. This ensures that neither tools nor loose parts can accidentally fall into the apparatus and cause some sort of damage.

One can see a conveyor chain assembly in FIG. 5 which includes both conveyor chains 8 that are connected to each other by connecting axles 32. In this arrangement, the conveyor chain assembly has a configuration that is fundamentally like a guide. The conveyor chain assembly, as is particularly evident from FIG. 6, is constructed of a multitude of conveyor chain segments 56, where each individual conveyor chain segment 56 features two chain links 10 and through-going connecting axles 32. Consecutive conveyor chain segments 56 are connected to each other at pivots 12.

On through-going connecting axles 32, between two chain segments 10, guide roller 58 is fastened, guided by guide rail 60. The embodiment form shown concerns guide rail 60 with an essentially U-shaped cross-sectional profile, where the distance between the two shanks of the U is somewhat larger than the diameter of guide roller 58. The guide roller advantageously has a running surface or running surface area that is formed of elastic, yielding material so that no excessively hard impulses are delivered to conveyor belt 6. It should be pointed out that guide roller 58 changes its turning direction when it alternates to the other shank from one of the shanks of U-shaped guide track 60. If two guide rollers 58 are provisioned next to each other on connecting axles 32 that form a gap between their running surfaces and which interface with an upright rib that extends in the direction of the gap and into the gap, guiding can be implemented in an essentially play-free fashion.

In the exploded view of FIG. 6, it can be seen out of how few different parts the conveyor chain assembly of the personnel conveyor according to the invention is constructed. This illustrates that individual chain links 10 are connected to each other, at mutually engaging end areas with engagement bolt 28, which carries chain roller 30 at its outer free end and the bearing or step bearing 46 at its inner free end. Connecting axle 32 is preferably provisioned in an area relatively close to the bearing, wherethrough a relatively large free cross-section, through which a service person can reach the interior of the apparatus, results with only one step detached.

The ratio of the segmentation of the conveyor chain to the segmentation of the conveyor belt is 1:1; that is, every chain link 10 or every conveyor chain segment 56 is attached to one step element 4.

If one looks again to FIG. 1, one can see plainly how dismounting is clearly simplified at a desired place on the conveyor path with the personnel conveyor 2 according to the invention. As the first step, the cover is removed from the relevant area of the balustrade or the balustrade facing. Next, with the special embodiment form, step flange element 18 is removed, as well as easily accessible step roller 22 on mounting arm 20. Further retaining springs 40 of mounting device 37 are unlocked, and are swung into an unengaged position. Now step element 4 can be taken out of conveyor belt 6 without problems. In an additional step, a desired number of additional step elements can be removed in the same way. If it further becomes necessary to remove step bearing 46, or conveyor chain segment 56 in its entirety, connection bolt 28 is removed from between two chain links 10 by means of a suitable removal device or another tool. In this procedure, chain roller 30 must be removed from the free end of bolt 28. When chain roller 30 is removed from both sides of a respective chain segment, this chain segment 56 is not guided by the guide tracks of chain rollers 30 and can be removed without problems after the further removal of bolts 28. One can see that the complete disassembly, and the following assembly, of the personnel conveyor can occur without necessarily operating conveyor belt 6. The guide track typically consists of a track rail on which the step roller runs, and a counter rail above the step roller that prevents it from moving in an upward direction. The track rail can, for example, be provisioned together with the guide track of the chain rollers on the frame of the personnel conveyor. The counter rail can be attached to the cover or the balustrade facing so that after the balustrade facing (or the cover) has been removed, the step rollers are free on the top. If step roller 22 is not fastened so that it stands to the outside from arm 20, as is shown in FIG. 1, but is provisioned so that it stands to the inside, then it is possible to provision the relative guide track for this step roller 22 on the covering or on the inside of the balustrade facing. With removal of this part for dismounting, the guide rail of step roller 22 is also no longer present in this area. Thus, step roller 22 is free, and dismounting of step element 4 is possible without having to dismount step roller 22 from arm 20.

Frequently, the covers or the balustrade facings are made of extruded material, for example, aluminum or an aluminum alloy. Manufacturing the guide tracks integrally when these parts are extruded does not present a problem. Alternatively, they can also be manufactured separately and then be attached by means of welding or other detachable or permanent means of attachment.

What is claimed is:

1. Personnel conveyor featuring an endless personnel conveyor belt formed of numerous step elements, in which the step elements are attached to conveyor chains along both of their sides that are driven around a first and a second reversal element, in which the conveyor chains are constructed of a multitude of chain links that are connected to each other at pivots, and in which the segmentation ratio of each conveyor chain to the personnel conveyor belt is 1:1, wherein two of the chain links, which are equally positioned in relation to one of the step elements, are connected to each other by means of a through-going connecting axle attached to the two chain links between each two pivoting points of each of the two chain links.

2. Personnel conveyor according to claim 1, characterized in that the chain links and connecting axles can be disconnected.

3. Personnel conveyor according to claim 1, characterized in that two of the chain links are connected to each other at the pivots with a bolt, while at least part of said bolt is configured in such a manner that one of the step element can be attached to it.

4. Personnel conveyor according to claim 3, characterized in that the attachment of the step elements on the conveyor chain occurs by means of lateral a mounting device on each of the step elements.

5. Personnel conveyor according to claim 1, characterized in that a guide roller, the rotating axis of which is essentially at a right angle to the plane between two chain links, is fastened to the connecting axle between the chain links, and in that a guide rail is provisioned on the personnel conveyor to work in conjunction with the guide roller to guide the conveyor chains and the personnel conveyor belt.

6. Personnel conveyor according to claim 5, characterized in that the guide rail has an essentially U-shaped cross-sectional profile, and in that the guide roller is provisioned between the two shanks of the U, where the distance between the two shanks of the U is somewhat larger than the diameter of the guide roller.

7. Personnel conveyor according to claim 5, characterized in that the guide rail has an essentially T-shaped cross-sectional profile, and in that two of the guide rollers are provisioned on one connecting axle that interface with the bridge of the T-shaped guide rail.

8. Personnel conveyor according to claim 1, characterized in that one of the step elements is attached at every pivot of the conveyor chain.

9. Conveyor chain segment for the pair of conveyor chains of personnel conveyor according to one of claims 1 through 8, with each said conveyor chain featuring a multitude of chain links that are connected to each other at pivots, characterized in that one chain link of one of the conveyor chains and one chain link of the other of the conveyor chains are connected by means of a connecting axle, which is fastened between the two pivots of each of the chain links.

10. Conveyor chain segment according to claim 9, characterized in that the conveyor chain segment can be dismantled.

11. Conveyor chain segment (56) according to claim 9, characterized in that a guide roller is fastened to each said connecting axle, the rotating axis of which is designed to be essentially perpendicular to the plane between chain links.

* * * * *